US006712325B2

(12) United States Patent
Choi

(10) Patent No.: US 6,712,325 B2
(45) Date of Patent: Mar. 30, 2004

(54) CUP HOLDER FOR AUTOMOBILE

(75) Inventor: Jae-Seob Choi, Youngin (KR)

(73) Assignee: Hyundai Mobis, Seoul (KR)

( * ) Notice: Subject to any disclaimer, the term of this patent is extended or adjusted under 35 U.S.C. 154(b) by 0 days.

(21) Appl. No.: 10/318,106

(22) Filed: Dec. 13, 2002

(65) Prior Publication Data

US 2003/0209643 A1 Nov. 13, 2003

(30) Foreign Application Priority Data

Jul. 5, 2002 (KR) ........................................ 2002-38957

(51) Int. Cl.⁷ ................................................. B60N 3/10
(52) U.S. Cl. ..................... 248/311.2; 224/926
(58) Field of Search ..................... 248/311.2; 224/282, 224/483, 544, 549, 553, 556, 564, 565, 566, 926; 297/188.14, 188.15, 188.16, 188.17

(56) References Cited

U.S. PATENT DOCUMENTS

| | | | | |
|---|---|---|---|---|
| 5,618,018 A | * | 4/1997 | Baniak ..................... 248/311.2 |
| 5,865,411 A | * | 2/1999 | Droste et al. ............. 248/311.2 |
| 5,944,240 A | * | 8/1999 | Honma ........................ 224/281 |
| 5,988,579 A | * | 11/1999 | Moner et al. ............. 248/311.2 |
| 6,010,047 A | * | 1/2000 | Osborn ........................ 224/281 |
| 6,095,471 A | | 8/2000 | Huang ..................... 248/311.2 |
| 6,349,913 B1 | * | 2/2002 | Jankowski ............... 248/311.2 |
| 6,578,806 B2 | * | 6/2003 | Dieringer et al. ........ 248/311.2 |

FOREIGN PATENT DOCUMENTS

| | | | |
|---|---|---|---|
| JP | 1059048 | | 3/1998 |
| JP | 410059047 A | * | 3/1998 |
| JP | 11348640 A | * | 12/1999 |

* cited by examiner

Primary Examiner—Ramon O. Ramirez
Assistant Examiner—Jon Szumny
(74) Attorney, Agent, or Firm—Greenblum & Bernstein, P.L.C.

(57) ABSTRACT

A cup holder for an automobile, which includes a housing inserted and fit into a central housing, a body sliding on a housing and a holder combined to the body to support a cup so that various parts are installed parallel to the central panel, and the cup holder can be vertically mounted to a narrow space formed at one side of the central panel.

12 Claims, 6 Drawing Sheets

CUP HOLDER FOR AUTOMOBILE

BACKGROUND OF THE INVENTION

1. Field of the Invention

The present invention relates to a cup holder for an automobile, and more particularly to a cup holder for an automobile, which includes a housing inserted and fit into a central housing, the body sliding on the housing and a holder combined with the body to support a cup so that the parts are installed parallel to the central panel, and the cup holder can be vertically mounted onto a narrow space formed at one side of the central panel.

2. Description of the Related Art

Generally, a cup holder is mounted to such as a central panel or a center console of an automobile so that a driver of a passenger may place a cup or a can thereon. Sometimes, the cup holder is equipped separately and attached to a certain position of the automobile when required. In most automobiles, the cup holder is mounted to the central panel.

The structure and operation of a conventional cup holder are described with reference to FIG. 1.

As shown in FIG. 1, an audio system 12 and an air conditioner control unit 13 are mounted to a central panel 11, and a cup holder 14 is mounted below the audio system 12 and the air conditioner control unit 13.

The cup holder 14 is slid outward when a user pushes a front surface of the cup holder 14, and the user may place a cup or a bottle on the extracted cup holder 14. When not using the cup holder 14, a user pushes the cup holder 14 until it is locked.

At this time, a support plate 15 is sometimes formed on a lower portion of the cup holder 14 in order to support a cup or a bottle.

Recently however, the size of the audio system is increased and an LED screen is equipped in the automobile so that a passenger may watch a moving image. Thus, this audio system occupies a significant portion of the central panel, so the air conditioner control unit and other requisite components mounted in the central panel can not be placed where the cup holder is mounted. Therefore, there is a problem in that the cup holder cannot be mounted in the central panel.

SUMMARY OF THE INVENTION

The present invention is designed to solve the problem of the prior art, and an object of the present invention is to provide a cup holder for an automobile which is capable of providing space so as to improve a product through space utilization, by mounting a cup holder vertically so as not to interfere with the space of an audio system and other functional components installed on the center of a central panel of an automobile.

In one aspect of the present invention, there is provided a cup holder of an automobile mounted to a central panel together with an audio system and various electronic devices, the cup holder comprising: a housing vertically inserted to one side of the central panel, the housing having at least one guide groove vertically formed at both sides thereof, the housing having a plurality of fixing plates protruding laterally at a front surface thereof, each of the fixing plates having a fixing hole; a body sliding into the housing and supporting a cup, the body including a front plate vertically formed and having a cover on the front surface thereof, a bottom plate connected to a lower end of the front plate and horizontally extending backward to a predetermined length, a combination plate connected to the end of the bottom plate and having guide protrusions formed at both sides thereof and inserted to the guide groove, and at least one pin hole being arranged front and rear at an upper portion of the combination plate; and a holder unit fixed by a pin to the pin hole of the body, the holder unit having first and second holders for holding the cup in opposite directions.

BRIEF DESCRIPTION OF THE DRAWINGS

Other objects and aspects of the present invention will become apparent from the following description of embodiments with reference to the accompanying drawing in which.

DESCRIPTION OF THE PREFERRED EMBODIMENT

Figure 1:
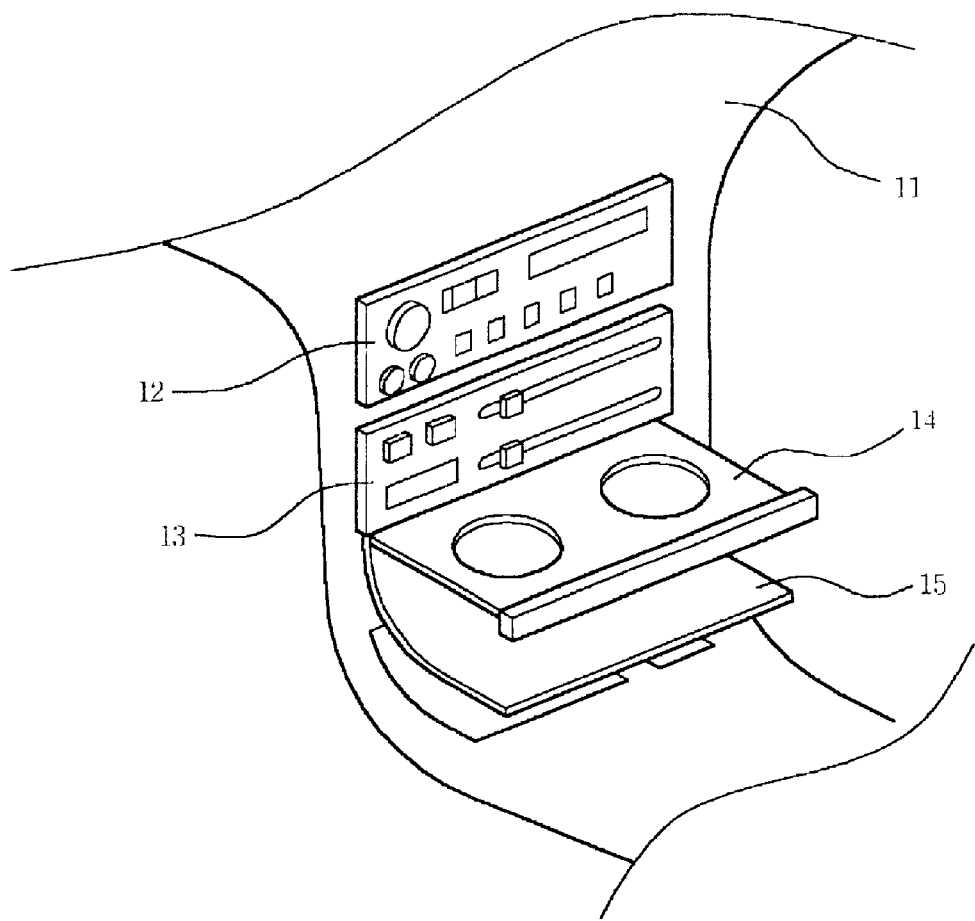
FIG. 1 shows the operating state of a conventional cup holder.

Hereinafter, the present invention will be described in more detail referring to the drawings. At this time, the embodiments below are not intended to limit the scope of the invention, but by way of illustration only, and like reference numeral and like names are used for an element same as the conventional configuration.

Figure 2:
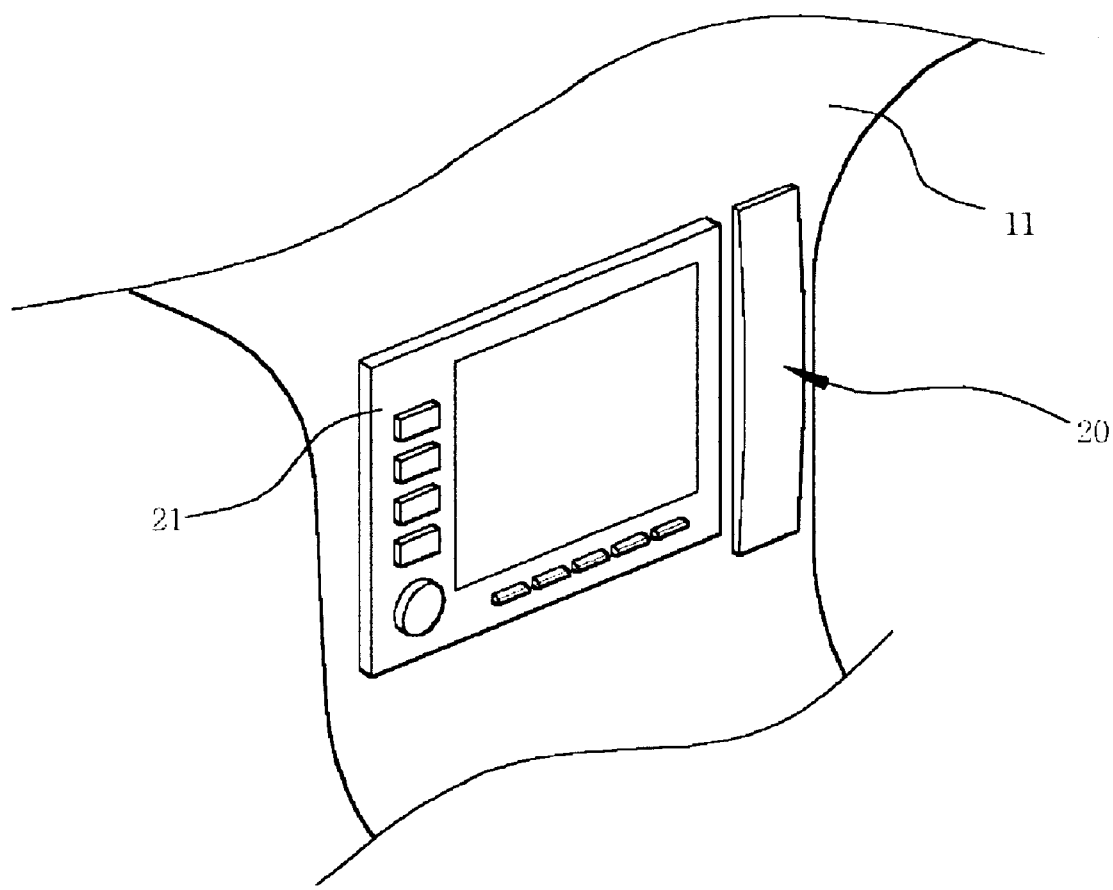
FIG. 2 shows an installation state of a cup holder according to the present invention.
Figure 3:
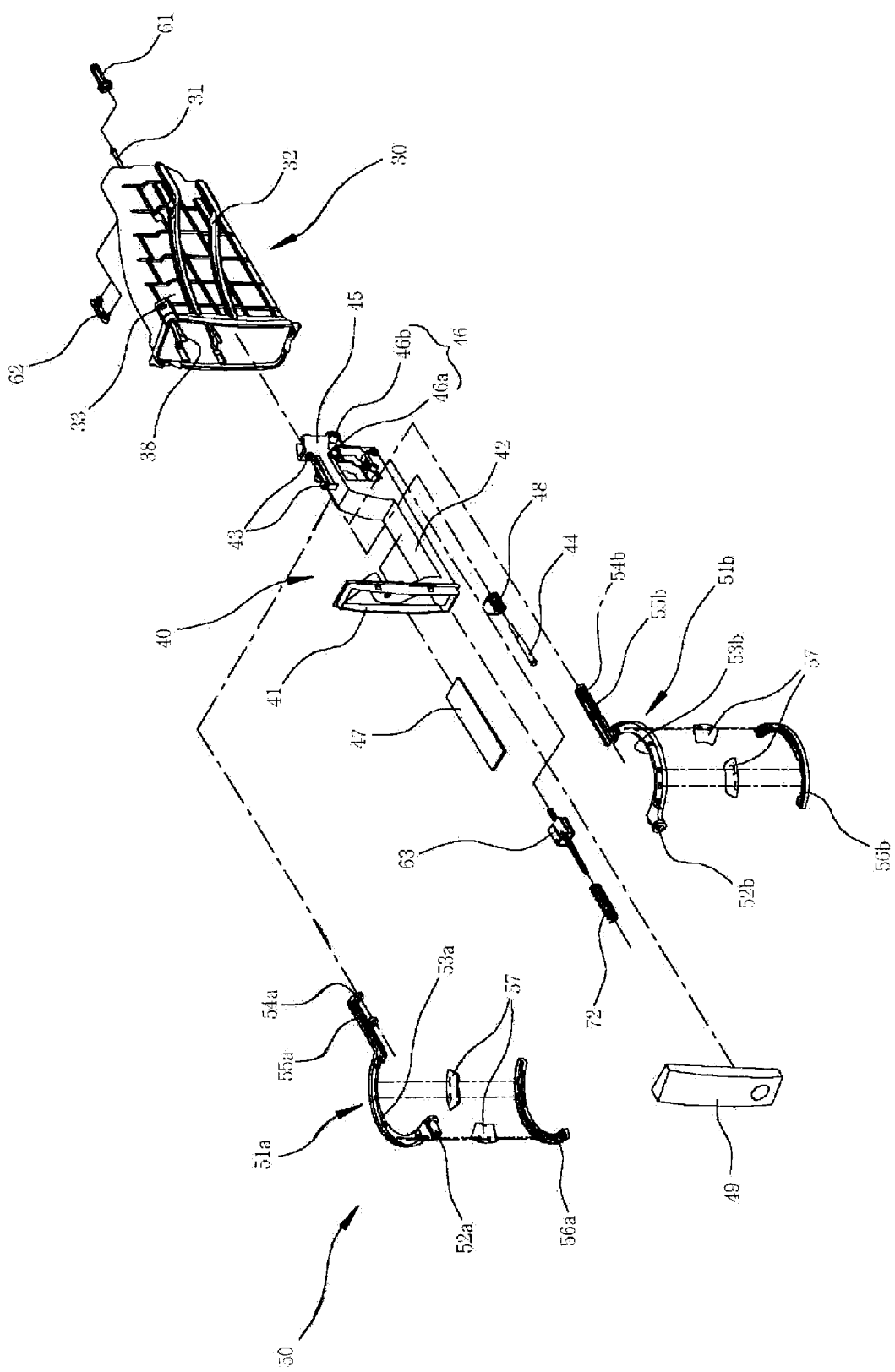
FIG. 3 is an exploded perspective view showing the cup holder according to the present invention.

FIG. 2 shows the installation state of a cup holder according to the present invention, and FIG. 3 is an exploded perspective view showing the cup holder of the present invention.

Figure 4:
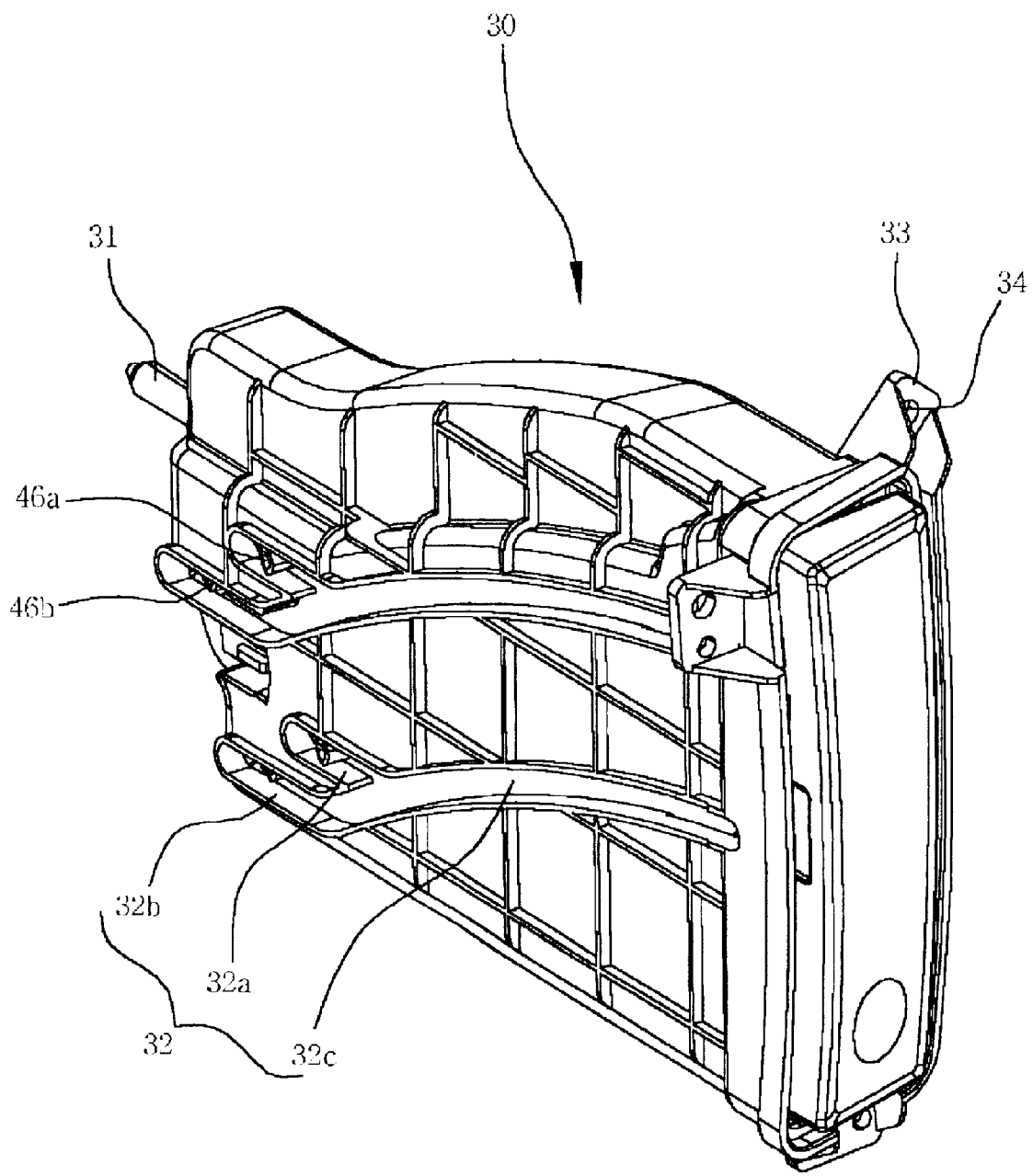
FIG. 4 is a perspective view showing the cup holder of the present invention in a closed state.
Figure 5:
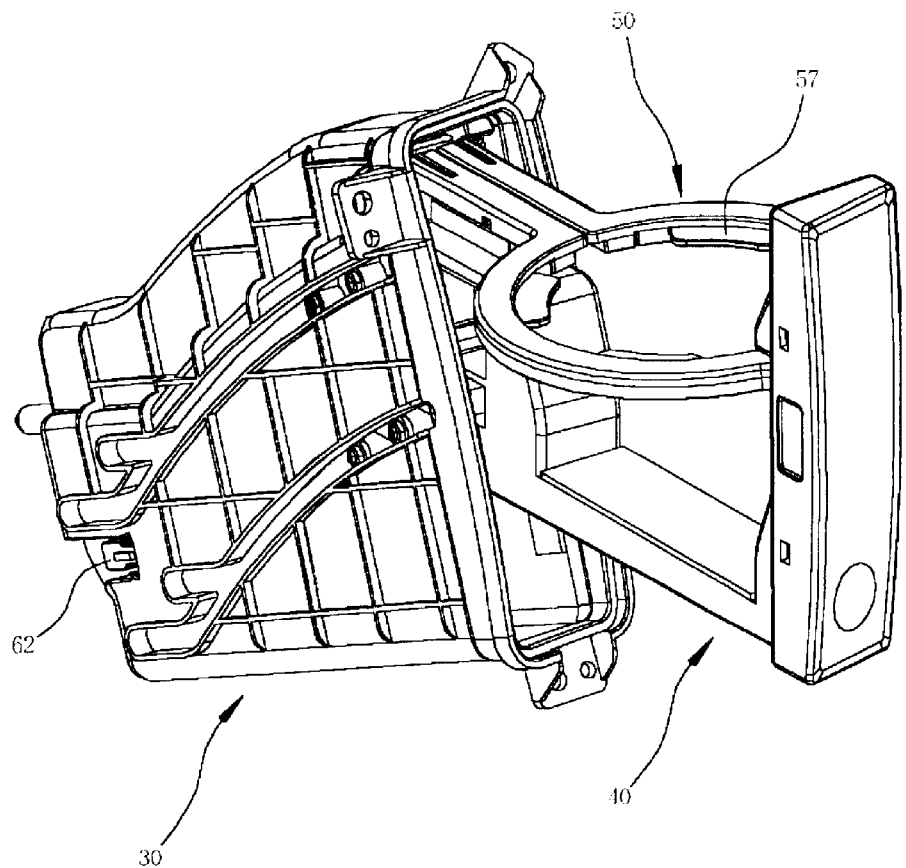
FIG. 5 is a perspective view showing the cup holder of the present invention in an open state.
Figure 6:
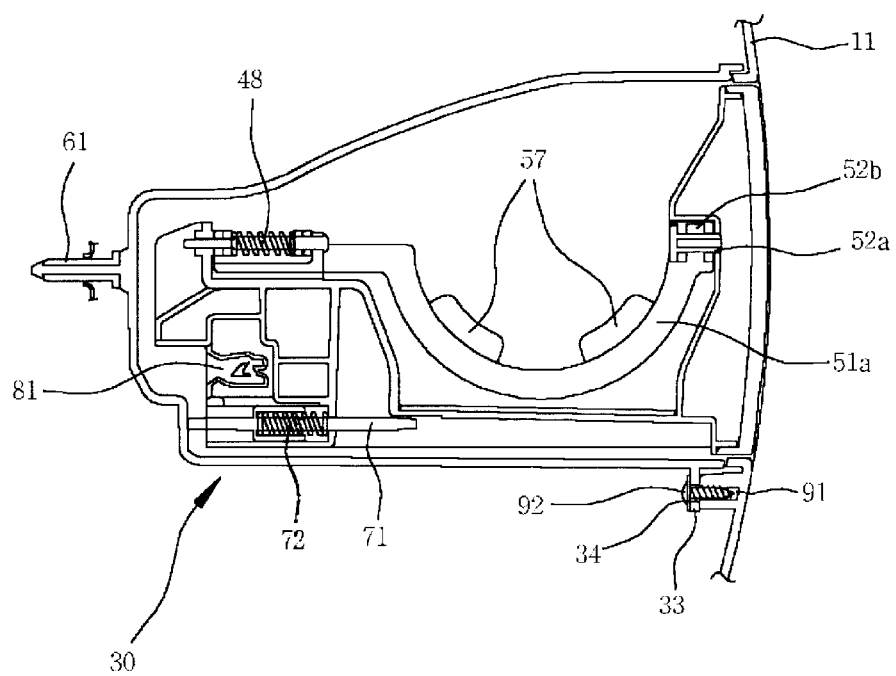
FIG. 6 is a side sectional view showing inner configuration of the cup holder of the present invention in a closed state.

In addition, FIG. 4 is a perspective view showing a closed state of the cup holder, FIG. 5 is a perspective view showing the open state of the cup holder, and FIG. 6 is a side sectional view showing inner configuration of the cup holder in a closed state.

As shown in the figures, the present invention is mainly directed to mounting the cup holder vertically in order to solve the problem of the prior art in that there is insufficient installation space for a cup holder because of audio systems and various electronic devices installed onto a central panel of an automobile.

In other words, to describe the present invention in more detail, an audio unit 21 is installed to a central panel 11 of an automobile. The audio unit 21 recently has more powerful functions. Particularly, there are provided an LCD screen for viewing television broadcasts or movies using a VCD and various recorders for CD, MD and cassette tapes in the audio unit 21, so the audio unit 21 occupies a broad installation space.

In addition, though not shown in the drawings, a switch for controlling the air conditioner is also installed onto the central panel 11, so it is very difficult to mount a cup holder horizontally onto the central panel 11. To solve this problem, an opening (not shown) is formed at a side of the central panel 11 and the cup holder 20 of the present invention is mounted thereto.

In brief, the cup holder 20 includes a housing 30 inserted into the central panel 11, a body 40 sliding through the housing 30 so as to be inserted into the housing 30 or extracted outward from the housing 30, and a holder unit 50 pivotally combined to the body 40 to hold a cup.

Therefore, the housing 30 is vertically inserted onto one side of the central panel 11. The housing 30 has at least one guide groove 32 formed at upper and lower portions of both sides thereof. The housing 30 also has a plurality of fixing plates 33 having a fixing hole 34 and protrudes laterally from the front surface thereof.

In addition, the body 40 is slid into the housing 30 and supports a cup. In this reason, the body 40 has a front plate 41 vertically formed. A cover 49 is attached to the front surface of the front plate 41. The body 40 also has a bottom plate 42 connected to a lower end of the front plate 41. The bottom plate 42 is horizontally formed backward at a predetermined length. The body 40 also has a combination plate 45 connected to an end of the bottom plate 42. Guide protrusions 46 are formed onto both sides of the combination plate 45 and inserted into the guide groove 32.

Also, at least one pinhole 43 is formed at both the front and rear of the upper portion of the combination plate 45.

The holder unit 50 includes first and second holders 51a and 51b mounted by fixing a pin 44 through the pin hole 43 of the body 40 to hold a cup from opposite directions.

A pin-type protrusion 31 is protruded from a rear side of the housing 30, and a damper guide 61 is mounted onto the central panel 11 so that the protrusion 31 may be inserted into the damper guide 61.

Preferably, the guide groove 32 includes first and second horizontal grooves 32a and 32b horizontally formed at upper and lower portions of a rear side of the housing 30, and a curved groove 32c connected to one ends of the first and second horizontal grooves 32a and 32b and curved upward to a front side of the housing 30. Corresponding to the guide groove 32, the guide protrusion 46 includes a first guide protrusion 46a moving along the first horizontal groove 32a and the curved groove 32c, and a second guide protrusion 46b moving along the second horizontal groove 32b and the curved groove 32c.

On the other hand, a mat 47 made of a soft material such as rubber or non-woven fabric is attached to the bottom plate 42 of the body 40 in order to prevent noise from a stored cup.

Also, a slider pin 71, to which an elastic material 72 is fit, is mounted to a lower portion of the combination plate 45 of the body 40 in order to extract the body 40 outward to a predetermined length.

The holder unit 50 including the first and second holders 51a and 51b is now described in more concretely. The first holder 51a includes a fixed protrusion 52a formed onto a front surface, a first semicircular plate 53a connected to an end of the fixed protrusion 52a and forming a semicircle to hold a cup, and a first combination stand 55a connected to an end of the first semicircular plate 53a and having a plurality of first combination holes 54a so that the pin 44 is inserted thereto. The second holder 51b includes an insert protrusion 52b formed at a front surface and inserted into the fixed protrusion 52a, a second semicircular plate 53b connected to an end of the insert protrusion 52b and forming a semicircle to hold the cup, and a second combination stand 55b connected to an end of the second semicircular plate 53b and having a plurality of second combination holes 54b so that the pin 44 is inserted thereto.

At this time, first and second lower plates 56a and 56b are mounted below the first and second semicircular plates 53a and 53b. Also, a plurality of compression members 57 made of an elastic material such as rubber are mounted between the first and second semicircular plates 53a and 53b and the first and second lower plates 56a and 56b so that a container of various sizes can be held.

A spring 48 is mounted to an outer circumference of the pin 44 so that both ends of the spring 48 support the bottom of the first and second combination plates 55a and 55b when the pin hole 43 and the first and second combination holes 54a and 54b are combined in a straight line using the pin 44. Thus, without external force exerted thereto, the first and second holders 51a and 51b are always spread horizontally by way of the spring 48.

A holder guiding projection 38 is protruded at the inner side of the housing 30 so that the first and second holders 51a and 51b are slid and folded into the housing 30.

Figure 7A:
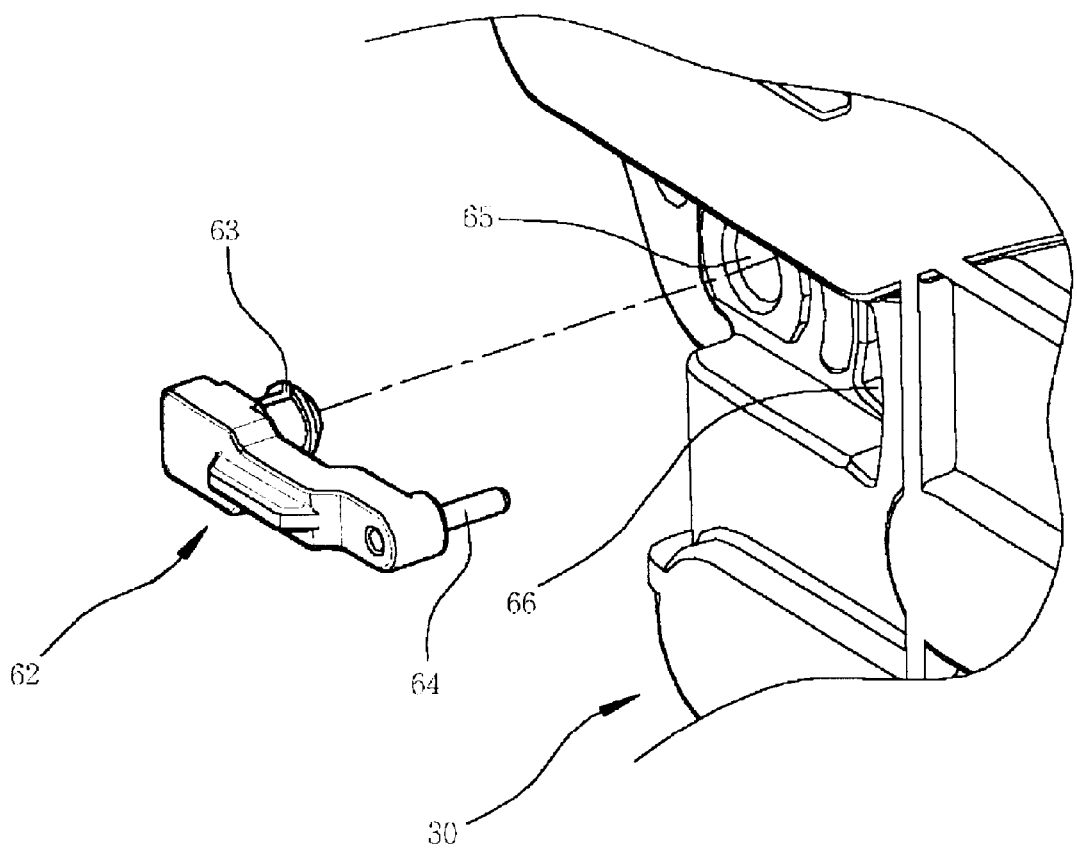
FIG. 7a is a perspective view showing a locking unit according to the present invention.
Figure 7B:
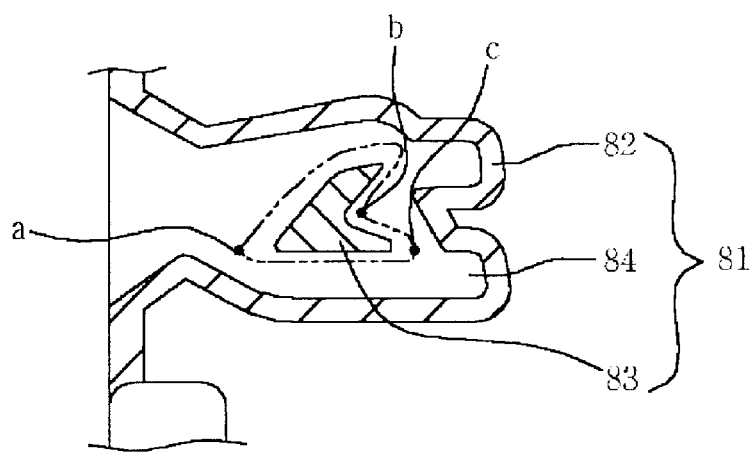
FIG. 7b shows an operating state of the locking unit and a fixing unit according to the present invention.

On the other hand, FIG. 7a is a perspective view showing a locking unit according to the present invention, and FIG. 7b shows an operating state of the locking unit and a fixing unit according to the present invention.

As shown in the figures, a shaft insert hole 65 and pin hole 66 are formed at one side of the housing 30. A rotary shaft 63 of the locking unit 62 having a locking pin 64 is inserted into the shaft insert hole 65 for rotation. The locking pin 64 inserted to the pinhole 66 is hooked to or unhooked from the fixing unit 81 formed at one side of the body 40 so as to lock or unlock the cup holder 20.

At this time, the fixing unit 81 is shaped so that a depressed portion 84 is formed between the rim protrusion 82 extended and a central protrusion 83 extending from the center of the rim protrusion 82, as shown in FIG. 7b.

Operation and effects of the cup holder as constructed above according to the present invention are as follows.

First, to see an assembling process of the cup holder 20 of the present invention, the housing 30 is inserted to an opening vertically formed to the central panel 11, and then a plurality of fixing holes 34 of the fixing plate 33 formed on the front side of the housing 30 and a plurality of fixing holes 91 formed to the central panel 11 corresponding to the fixing holes 34 are arranged in a vertical line and then fixed with bolts 92 as shown in FIG. 6.

At this time, the pin-type protrusion 31 is formed at the rear surface of the housing 30, and the protrusion 31 is inserted to the damper guide 61 formed at an inside of the central panel 11 in order to facilitate easy assembling and reduce vibration.

Also, the body 40 is mounted to the inside of the housing 30. At this time, the first guide protrusions 46a formed on both sides of the combination plate 45 of the body 40 are inserted into the first horizontal groove 32a, and the second guide protrusions 46b are inserted into the second horizontal groove 32b.

In addition, the slider pin 71 is inserted to a lower portion of the combination plate 45, and the elastic material 72 having elasticity such as a spring is inserted into the outer circumference of the slider pin 71.

In order to lock or release the cup holder 20 of the present invention, the rotary shaft 63 of the locking unit 62 is fit to the shaft insert hole 65 formed at one side of the housing 30, and the locking pin 64 of the locking unit 62 is inserted into the pin hole 66 formed at one side of the housing 30. At this time, the pinhole 66 preferably has a groove so that the locking pin 64 may pivot vertically a predetermined distance from a center of the rotary shaft 63, more specifically, in an arc having a fan shape.

On the other hand, the first and second combination holes 54a and 54b protruding from the first and second combination stands 55a and 55b of the first and second holders 51a and 51b are positioned in a line parallel to the pin holes 43 formed at an upper portion of the combination plate 45. Then, the pin 44 is inserted into the holes 54a, 54b and 43 so that the first and second holders 51a and 51b may rotate. In addition, the spring 48 is mounted to an outer circumference of the pin 44, and both ends of the spring 48 are configured to engage the bottom of the first and second combination stands 55a and 55b so that the first and second holders 51a and 51b may be spread horizontally owing to their elasticity.

At this time, the cylindrical fixing protrusion 52a is formed at a front surface of the first holder 51a, and the insert protrusion 52b is formed on the front surface of the second holder 51b so that the fixing protrusion 52a may be inserted thereto. Thus, when combined, the first and second holders 51a and 51b may rotate vertically without any difficulty.

In addition, the compression member 57 made of an elastic material such as rubber is inserted and assembled between the first and second semicircular plates 53a and 53b and the first and second lower plates 56a and 56b of the first and second holders 51a and 51b so that a container having various sizes may be received therein.

Now, operation of the cup holder 20 assembled as above is described in more detail.

First, if a user pushes the body 40 for receipt of the cup holder 20 while the holder unit 50 is extracted outward to store a cup or a container, the body 40 is slid into the housing 30. At this time, the holder guiding projection 38 curved downward in the body 40 presses the first and second holders 51a and 51b slid into the housing 30, so the first and second holder 51a and 51b are automatically folded.

In this case, the first and second guide protrusions 46a and 46b turn downward along the curved groove 32c of each guide groove 32 formed at an outer side of the housing 30.

Also, if pushing the cup holder 20 continuously, the first guide protrusion 46a moves horizontally to the first horizontal groove 32a, and the second guide protrusion 46b moves horizontally to the second horizontal groove 32b.

At the same time, as shown in FIG. 7b, the locking pin 64 of the locking unit 62 moves from point (a) to point (b) of the depressed portion 84 of the fixing unit 81 along a dotted line and is then hooked to a concave portion formed on the central protrusion 83 so that the body 40 is locked to the housing 30.

At this time, the elastic material 72 of the slider pin 71 mounted to the lower portion of the combination plate 45 of the body 40 is retracted. Thus an elastic energy is stored into the elastic material 72 of the slider pin 71.

On the other hand, if a user pushes the received cup holder 20 for an instant to use the cup holder 20, the locking pin 64 of the locking unit 62 moves from point (b) to a point (c) of the depressed portion 84 of the fixing unit 81 along the dotted line, as shown in FIG. 7b, so that the body 40 is unlocked from the housing 30. Simultaneously, owing to the stored elastic energy of the elastic material 72 of the slider pin 71 mounted to the lower portion of the combination plate 45 of the body 40, the body 40 is extracted outward.

As a result, the locking pin 64 of the locking unit 62 moves from point (c) to point (a) of the depressed portion 84 of the fixing unit 81 along the dotted line as shown in FIG. 7b. Thus, the first guide protrusion 46a moves horizontally until the end of the first horizontal groove 32a connected to the curved groove 32c, and the second guide protrusion 46b moves horizontally until the end of the second horizontal groove 32b connected to the curved groove 32c.

In this state, if a user draws the extracted body 40 to a predetermined distance from the central panel 11 by the hand, the first and second guide protrusions 46a and 46b moves upward along the curved groove 32c of each guide groove 32 formed on the outer surface of the housing 30.

In addition, as the holder unit 50 is drawn outward, the first and second holders 51a and 51b are spread horizontally due to the elastic force of the spring 48 because the holder guiding projection 38 does not press the first and second holders 51a and 51b.

If inserting a cup into the cup holder unit 50 in this state, the compression member 57 compresses the cup with the elastic force, so the cup holder unit 50 may receive a cup having various sizes.

According to the cup holder for an automobile of the present invention constructed as above, the cup holder is installed vertically to one side of the central panel, so it may advantageously ensure installation space for the cup holder even though many components are installed into the central panel.

What is claimed is:

1. A cup holder mounted to a central panel of an automobile, the cup holder comprising:
   a housing vertically inserted to one side of the central panel, the housing having at least one inclined guide groove formed at both sides thereof and longitudinally extending in a direction having both a horizontal and a vertical component, the housing having a plurality of fixing plates extending laterally from the front surface thereof, each of the fixing plates having a fixing hole;
   a body sliding into the housing and supporting a cup, the body including a front plate vertically formed and having a cover on the front surface thereof, a bottom plate connected to a lower end of the front plate and horizontally extending backward to a predetermined length, a combination plate connected to an end of the bottom plate and having guide protrusions formed at both sides thereof and inserted to the guide groove, and at least one pin hole being arranged to the front and rear of the upper portion of the combination plate; and
   a holder unit fixed by a pin into a pin hole of the body, the holder unit having first and second holders for holding the cup from opposite directions.

2. The cup holder according to claim 1, wherein a pin-type protrusion is extended at the rear side of the housing, and a damper guide is mounted in the central panel so that the pin-type protrusion is inserted thereto.

3. The cup holder according to claim 1, wherein the guide groove includes:
   first and second horizontal grooves arranged horizontally at upper and lower portions of a rear side of the housing; and
   a curved groove connected to one end of the first and second horizontal grooves and curved upward at the front side of the housing.

4. The cup holder according to claim 3, wherein the guide protrusion includes:
   a first guide protrusion moving along the first horizontal groove and the curved groove; and
   a second guide protrusion moving along the second horizontal groove and the curved groove.

5. The cup holder according to claim 1, further comprising a mat attached to the bottom plate of the body.

6. The cup holder according to claim 1, wherein a slider pin to which an elastic material is fit is mounted to a lower portion of the combination plate of the body so as to extract the body outward to a predetermined length.

7. The cup holder according to claim 1, further comprising a locking mechanism,
   wherein a shaft insert hole and a pin hole are formed at one side of the housing,
   a rotary shaft of the locking mechanism having a locking pin is inserted into the shaft insert hole for rotation, and
   the locking pin inserted into the pin hole is hooked to or unhooked from a fixing portion formed at one side of the housing in order to lock or unlock the cup holder.

8. The cup holder according to claim 7, wherein the fixing portion includes:
   a rim protrusion;
   a central protrusion at the center of the rim protrusion; and
   a depressed portion formed between the rim protrusion and the central protrusion.

9. The cup holder according to claim 1,
   wherein the first holder of the holder unit includes:
      a fixed protrusion formed at a front surface of the first holder;
      a semicircular plate connected to an end of the fixed protrusion and forming a semicircle in order to hold a cup; and
      a combination stand connected to an end of the semicircular plate and having a plurality of combination holes for insertion of pins, and
   the second holder of the holder unit includes:
      an insert protrusion formed at a front surface of the second holder and inserted to the fixed protrusion of the first holder;
      a semicircular plate connected to an end of the insert protrusion and forming a semicircle in order to hold the cup; and
      a combination stand connected to an end of the semicircular plate and having a plurality of combination holes for insertion of pins.

10. The cup holder according to claim 9, wherein lower plates are mounted to lower portions of the respective semicircular plates, and compression members are mounted between the respective semicircular plates and the lower plates.

11. The cup holder according to claim 9, wherein the pinhole and the combination holes are combined with a pin, and a spring is mounted to the outer circumference of the pin.

12. The cup holder according to claim 1, wherein a holder guiding projection is curved downward and protruded into the inner side of the housing so that the first and second holders are slid and folded into the housing.

* * * * *